(No Model.)
E. WESTON.
INDEX CONTROLLING DEVICE FOR ELECTRICAL MEASURING INSTRUMENTS.
No. 440,291. Patented Nov. 11, 1890.
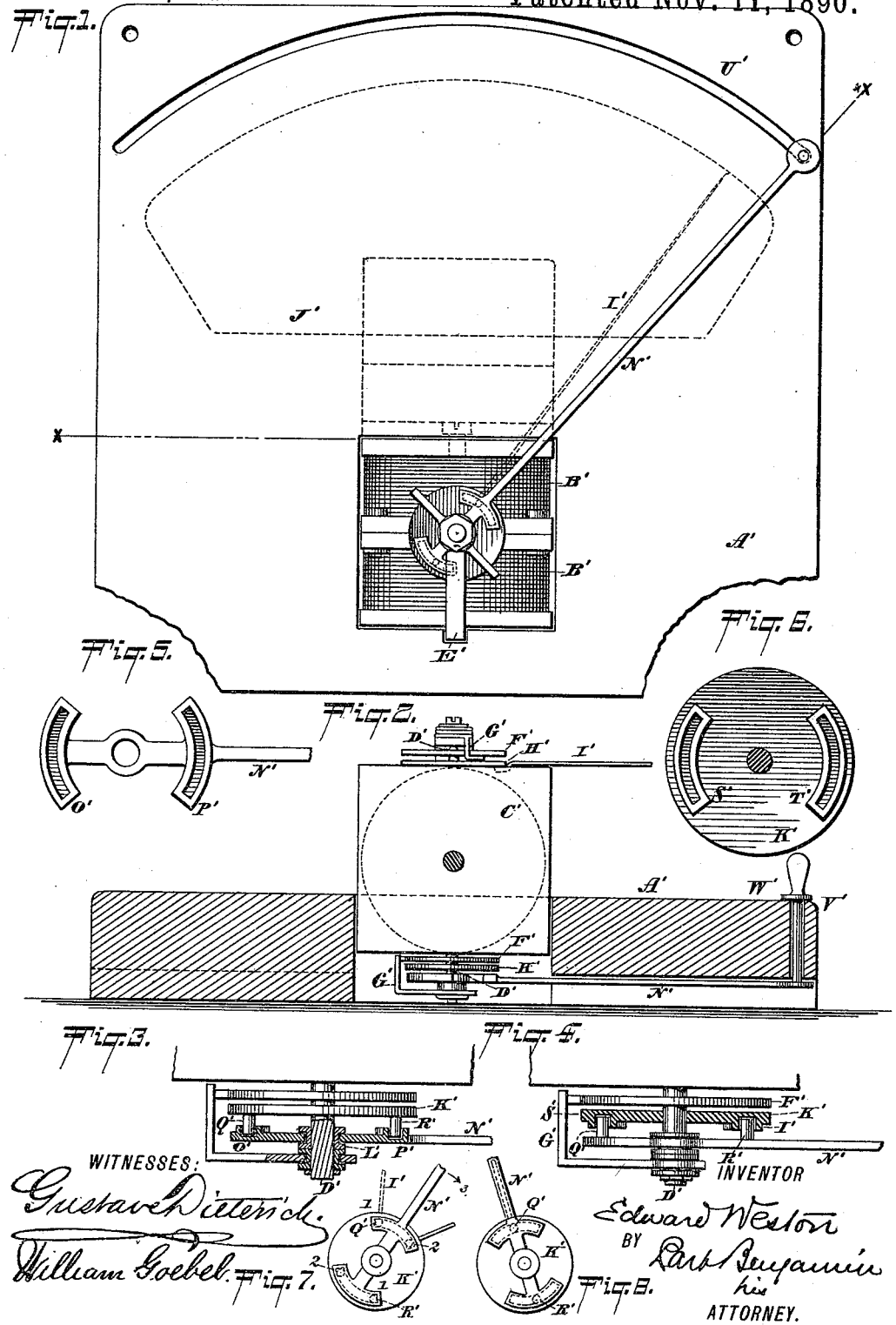
WITNESSES:
Gustave Dieterich
William Goebel
INVENTOR
Edward Weston
BY Park Benjamin
his ATTORNEY.

UNITED STATES PATENT OFFICE.

EDWARD WESTON, OF NEWARK, NEW JERSEY.

INDEX-CONTROLLING DEVICE FOR ELECTRICAL MEASURING-INSTRUMENTS.

SPECIFICATION forming part of Letters Patent No. 440,291, dated November 11, 1890.

Application filed June 25, 1890. Serial No. 356,600. (No model.)

*To all whom it may concern:*

Be it known that I, EDWARD WESTON, of Newark, Essex county, New Jersey, have invented a new and useful Improvement in Index-Controlling Devices for Electrical Measuring-Instruments, of which the following is a specification.

My invention relates to that class of electrical measuring-instruments in which an index needle or pointer is moved over a graduated scale by the current which traverses the instrument, and shows by its position on said scale the current strength, pressure, or any other information. In instruments of this class when the current is established the needle is very apt to be thrown violently around, often to the limit of the scale and against a stop, after which it oscillates for a greater or less period and finally comes to rest opposite the scale-marking indicated. There is always danger of breaking or displacing the pointer, and there is loss of time in waiting for the oscillations to cease.

My present invention consists in a device for controlling the movement of the index-needle, so that it will move slowly up to its indication and stay there without any violent contact with its stops or undue oscillation; and it consists more particularly in the construction and arrangement of the said device, as hereinafter set forth.

In the accompanying drawings my invention is shown applied to an instrument devised for the measurement of alternating currents of electricity, and constructed substantially as set forth in my pending application for Letters Patent, Serial No. 337,379, filed January 18, 1890.

Figure 1 is a bottom view of the instrument. Fig. 2 is a sectional view on the line X X of Fig. 1. Fig. 3 is an enlarged detail and partial sectional view of my device. Fig. 4 is a similar view of a modification thereof. Fig. 5 shows a portion of the guiding arm or rod provided with the curved sectors containing slots or recesses. Fig. 6 is a bottom view of the disk K', showing the curved slots or recesses made in the disk. Figs. 7 and 8, respectively, show different positions of the guide-arm, disk, and needle.

Similar letters of reference indicate like parts.

A' is the base-board of the instrument, provided with a suitable recess to receive the parallel coils B' B'. Within the said coils in the type of instrument here illustrated there is arranged a circular coil C', (dotted lines,) supported on diametral pivots D', which pivots extend through the spools B', and are received in suitable steps, which are carried by the arms E'. Surrounding the said pivot are springs F', one end of each spring being fastened to the pivot and the other end to an arm G', which arm turns freely on the pivot, and by means of which the tension of the springs may be adjusted. Supported on the upper pivot-pin is a disk H', which carries the index needle or pointer I'. The said index extends over a suitable scale, as J', (dotted lines, Fig. 1,) and serves to show angular changes in position of the inner or movable coil. The circuit in the instrument proceeds through the coils B' B', and also through the movable coil, (not shown,) so that when a current is established the inner coil assumes a position (turning on its pivots) having a relation to the difference of potential between the terminals of the instrument.

The instrument so far as above described is substantially the same as that set forth in my above-named prior application, and hence I do not claim any of its essential features herein.

On the lower pivot of the movable coil and below the under side of the spools B' B' is secured a disk K'. Below the disk K' and turning on a collar L', which is received upon the pivot D', is an arm N', having on each side of its pivot-center curved pieces O' P', in which are formed arc-shaped slots concentric with said pivot-center. On the disk K' are two fixed pins Q' R', which project downwardly and enter the slots in the rod N'.

The above-described arrangement is shown in Fig. 3; but I may modify it as shown in Figs. 4 and 6, in which curved slots precisely similar to those which are made in the parts O' P' of the arm N' are formed at S' T' in the disk K', and the fixed pins Q' R', which enter said slots, are carried by the arm N'.

Either form of apparatus operates in precisely the same way. In the base-board A is made a slot U', which receives a vertical pin V', extending upward from the end of the arm N', and this pin carries a handle W', which projects above the base-board.

The operation of the device is as follows, reference now being made more particularly to Figs. 7 and 8: I' (dotted lines) shows the position of the needle when no current is passing through the instrument. The pins Q' R' on the disk K' will then be at the extreme ends 1 of the slots in the arm N'. Now when a current is established the needle cannot fly over the whole scale, because the pins Q' R' will meet the opposite ends of the slots in the arm N' at the points 2, so that instead of the needle moving over all the scale it can move over only the distance to which the pins are limited by the curved slots which receive them; but the actual point to be indicated by the needle and due to the difference of potential existing may be far in advance of the point at which the needle meets the limiting-stop. The arm N' is then moved by hand in the direction of the arrow 3, and as long as the current tends to move the needle farther along the pins Q' R' will remain in the position against the ends of the slots in said arm N'. As soon, however, as the needle has reached its proper indication, then it has no longer any tendency to follow the moving arm N', and this fact will become at once apparent by the needle becoming left behind and showing a slight quivering as the arm is carried farther forward. The position of the pins Q' R' is then shown in Figs. 1 and 8, and is at some point along the length of the slots. The advantage of this arrangement is that the needle can never have but a very small range of motion caused at once by the current, and hence it cannot acquire momentum enough to be dashed violently against far-distant limiting-stops, nor can it vibrate over any large area. The rod N' may be moved by hand as slowly as desired, and the needle will follow it until the proper scale-marking is indicated, so that the needle is moved to its indication without jerk or vibration, and even very slowly, if that be desired.

I claim—

1. In an electrical measuring-instrument, a pivoted body, a means of indicating the extent of rotary movement of said body, and a second body moving about a center in line with the center of rotation of said first pivoted body, one of said bodies being provided with a laterally-projecting stop or pin and the other having a recess in which said stop enters and whereby the path of movement of said stop is limited.

2. In an electrical measuring-instrument, a pivoted body, a means of indicating the extent of rotary movement of said body, a second body moving about a center in line with the center of rotation of said first-pivoted body, and a means of manually rotating one of said bodies, one body being provided with a laterally-projecting stop or pin and the other having a recess in which said stop enters and whereby the path of movement of said stop is limited.

3. In an electrical measuring-instrument, a pivoted body, a motor mechanism for vibrating or rotating the same, a means of indicating the extent of rotary movement of said body, a second body pivoted on a center in line with the center of rotation of said first pivoted body, and a means of manually rotating said second body, one of said bodies being provided with a laterally-projecting stop or pin and the other having a recess in which said stop enters and whereby the path of movement of said stop is limited.

4. In an electrical measuring-instrument, a pivoted body carrying an index, a second body moving about a center in line with the center of rotation of said first body, and a means of manually turning or rotating said second body, one of said bodies being provided with a laterally-projecting stop or pin and the other having a recess in which said stop enters and whereby the extent of movement of said needle is limited.

5. In an electrical measuring-instrument, a vibrating pivoted coil, an index-needle supported on the coil-pivot, a body fast on said pivot, a second body moving about the same pivot-axis, and a means of manually rotating said last-named body, one of said bodies being provided with a stop or pin and the other having a recess in which said stop enters and whereby the extent of movement of said coil is limited.

6. In an electrical measuring-instrument, the combination of the fixed coils B', pivoted coil C', needle I', supported on the coil-pivot disk K', having pins R' Q' fast on said pivot, and rod N', having recesses O' P' receiving said pins R' Q', said rod being loose on said pivot.

EDWARD WESTON.

Witnesses:
M. BOSCH,
JAMES T. LAW.